Patented Dec. 6, 1932

1,890,231

UNITED STATES PATENT OFFICE

JOSEPH C. PATRICK AND NATHAN M. MNOOKIN, OF KANSAS CITY, MISSOURI

VULCANIZABLE COMPOUNDS AND VULCANIZED PRODUCTS DERIVED THEREFROM

No Drawing. Application filed May 28, 1928, Serial No. 281,351. Renewed October 3, 1932.

This invention relates to vulcanizable compounds and vulcanized products derived therefrom.

In application Serial No. 239,808, filed December 13, 1927, by one of us, there is described a new plastic derived from the interaction of halogen additive compounds of olefins with soluble polysulfides, especially those of the alkali metals, alkaline earth metals and ammonia, which may conveniently be termed "alkaline polysulfides". These plastics may be conveniently designated olefin polysulfide plastics, since in their production, the halogen is eliminated. The mechanical properties of such plastics can be controlled to a considerable degree by regulation of the sulfur content of the polysulfide used in their preparation. For example, ethylene halogen additive compounds react with polysulfide solutions with a sulfur content corresponding approximately to the formulæ $CaS_4$ and $Na_2S_4$ to give a soft, pliable and elastic plastic, somewhat resembling soft vulcanized rubber in appearance, while lower polysulfides corresponding in sulfur content to $Na_2S_2$ or $Na_2S_3$ or a mixture thereof give hard plastics which resemble vulcanite in appearance and mechanical properties. These plastics are characterized by a high sulfur content. The soft plastic derived from ethylene di-chloride may contain between 74 and 85% of sulfur while the hard plastic has a somewhat lower sulfur content. The hard plastic melts around 100 to 120° C. while the softer plastic softens above 140° C. but does not become as fluid as the molten hard plastic.

Both the hard plastic and the soft plastic as well as plastics of intermediate classification are employed according to the present invention by being incorporated with unvulcanized rubber together with sulfur and, if desired, with fillers, pigments and other additions to yield vulcanizable compositions which can be readily vulcanized to give products closely resembling soft vulcanized rubber in mechanical properties and general utility. In general, it is preferred to employ the soft plastics because of their higher sulfur content, cheapness and the superior properties of the resulting products.

The relative proportions of plastic and sulfur can be varied over very wide limits. For example, we have found that valuable products may be obtained by incorporating with plastic, rubber to the amount of 3% thereof, together with a suitable amount of sulfur and vulcanizing. In general, however, it is preferred to employ larger percentages of rubber.

The amount of sulfur which the composition may contain may also vary over very wide limits. A suitable amount of sulfur is that sufficient for the vulcanization of the rubber content, for example, about 5% more or less of the rubber. It is found, however, that very considerable quantities of elemental sulfur, for example, equal in quantity to the rubber or greater, may be added to the compound without adversely affecting the properties of the vulcanized product. The employment of such excess of sulfur has little or no effect upon the hardness of the vulcanized product which resembles soft vulcanized rubber in mechanical properties.

Small quantities of various vulcanizing accelerators, such as diphenyl guanidine, hexamethylenetetramine, aldehydeammonia, aniline, thiocarbanilide and thermlo F, may be added to the composition before vulcanization. Ordinarily the addition of such accelerators is unnecessary since the plastic appears to exert a considerable accelerating effect upon the vulcanization of the rubber content. Other substances which may be added comprise lead oxide, zinc oxide, magnesium carbonate, magnesium oxide, calcium oxide, calcium carbonate, pigments, carbon black, glue and other additions employed in rubber compounding.

In preparing the unvulcanized composition, the plastic, sulfur, unvulcanized rubber and additions, if any, are incorporated in a mill at about 80° C. Although the temperature is below the melting or softening point of the plastic, the materials become thoroughly mixed without difficulty. The resulting compound is rubbery to the touch and can be readily molded and formed into desired shapes, being softened by heat if necessary. It may be vulcanized in manner analogous to the vulcanization of rubber.

The invention will be more completely understood from the following examples. The plastic employed therein is derived from ethylene.

Example I

| | Per cent |
|---|---|
| Hard plastic (68.6% sulfur) | 28.5 |
| Coagulated rubber latex | 28.5 |
| Sulfur | 25.6 |
| Zinc oxide | 17.4 |

These ingredients were milled as described above and on cooling gave a grayish white substance of board-like hardness. When vulcanized for 70 minutes at 275° F. it yielded a product free from bloom and having the same appearance as inner tube rubber. The elasticity was extremely good but the strength was somewhat poorer than the similar product derived from the soft higher sulfur plastic. The sulfur content of the product is 45.1%.

Example II

| | Per cent |
|---|---|
| Soft plastic (83.1% sulfur) | 35.6 |
| Coagulated rubber latex | 35.6 |
| Sulfur | 14.3 |
| Zinc oxide | 14.5 |

The product of vulcanization under the conditions stated in Example I gave a similar result except that the product had a much greater tensile strength and a low permanent set. The sulfur content of the product is 43.9%.

Example III

| | Per cent |
|---|---|
| Soft plastic (84.0% sulfur) | 69.3 |
| Smoked sheet rubber | 6.9 |
| Lead oxide | 6.9 |
| Sulfur | 6.9 |
| Coal tar pitch | 6.9 |
| Carbon black | 2.8 |
| Thiocarbanilide | 0.3 |

The composition is vulcanized at 270° F. for 105 minutes. While its properties such as tensile strength, permanent set, etc., are somewhat inferior to the compounds containing a higher percentage of rubber, nevertheless the vulcanized product possesses considerable tensile strength and wide limits of elasticity. The sulfur content of the product is about 65.1%.

Example IV

| | Per cent |
|---|---|
| Soft plastic | 24.5 |
| Smoked sheet rubber | 36.7 |
| Sulfur | 18.4 |
| Zinc oxide | 12.3 |
| Zinc stearate | 2.5 |
| Hard wood pitch | 2.5 |
| Carbon black | 2.5 |
| Pine tar | 0.3 |
| Thermlo F | 0.3 |

The composition is readily vulcanized under conditions similar to those set forth in previous examples.

Example V

| | Per cent |
|---|---|
| Soft plastic | 24.7 |
| Coagulated rubber latex | 24.7 |
| Sulfur | 24.7 |
| Zinc oxide | 24.7 |
| Pine tar | 1.2 |

The composition is vulcanized for 80 minutes at 30 lbs. of steam.

With the exception of the product of Example III, the products are strong elastic materials resembling with respect to strength, elastic properties and outward appearance, soft vulcanized rubber of superior quality. Generally with increase of rubber content the tensile strength increases and permanent set becomes lower. These compositions possess remarkable resistance to oxidation and sun cracking. The resistance to oxidation decreases somewhat with increasing rubber content.

Notwithstanding the high amounts of free sulfur which may be contained in the vulcanized products, they do not exhibit "bloom" which occurs in vulcanized rubber which contains excessive amounts of free sulfur.

By the term "unvulcanized rubber", we intend to include not only new or raw rubber but also reclaimed rubber. In general the products containing reclaimed rubber are less satisfactory than those produced by the use of raw unvulcanized rubber.

Although the present invention has been described in connection with the details of specific examples thereof, it is not intended that such details shall be regarded as limitations upon the scope of the invention except in so far as included in the accompanying claims.

We claim:

1. A vulcanizable composition comprising high sulfur plastic of the type of additive polysulfides of olefines of the general formula $C_nH_{2n}$, unvulcanized rubber, and sulfur.

2. A vulcanizable composition comprising high sulfur plastic of the type of additive polysulfides of olefines of the general formula $C_nH_{2n}$, unvulcanized rubber, and sulfur in amount at least sufficient for the vulcanization of said rubber.

3. A vulcanizable composition comprising high sulfur plastic of the type of additive polysulfides of olefines of the general formula $C_nH_{2n}$, unvulcanized rubber, and sulfur in amount considerably exceeding that necessary for the vulcanization of said rubber.

4. A vulcanizable composition comprising high sulfur plastic of the type of additive polysulfides of olefines of the general formula $C_nH_{2n}$, unvulcanized rubber in substantial quantities relative to the amount of plastic and sulfur.

5. A vulcanizable composition comprising high sulfur plastic of the type of additive polysulfides of olefines of the general formula $C_nH_{2n}$, unvulcanized rubber in substantial quantities relative to the amount of plastic and sulfur in amount at least sufficient for the vulcanization of said rubber.

6. A vulcanizable composition comprising high sulfur plastic of the type of additive polysulfides of olefines of the general formula $C_nH_{2n}$, unvulcanized rubber in substantial quantities relative to the amount of plastic and sulfur in amount considerably exceeding that necessary for the vulcanization of said rubber.

7. A vulcanizable composition comprising high sulfur plastic of the type of additive polysulfides of olefines of the general formula $C_nH_{2n}$, unvulcanized rubber, and sulfur, in substantially equal quantities.

8. A vulcanizable composition comprising high sulfur soft plastic of the type of additive polysulfides of olefines of the general formula $C_nH_{2n}$, unvulcanized rubber, and sulfur.

9. A vulcanizable composition comprising high sulfur soft plastic of the type of additive polysulfides of olefines of the general formula $C_nH_{2n}$, unvulcanized rubber, and sulfur, in amount at least sufficient for the vulcanization of said rubber.

10. A vulcanizable composition comprising high sulfur soft plastic of the type of additive polysulfides of olefines of the general formula $C_nH_{2n}$, unvulcanized rubber, and sulfur in amount considerably exceeding that necessary for the vulcanization of said rubber.

11. A vulcanizable composition comprising high sulfur soft plastic of the type of additive polysulfides of olefines of the general formula $C_nH_{2n}$, unvulcanized rubber in substantial quantities relative to the amount of plastic and sulfur.

12. A vulcanizable composition comprising high sulfur soft plastic of the type of additive polysulfides of olefines of the general formula $C_nH_{2n}$, unvulcanized rubber in substantial quantities relative to the amount of plastic and sulfur in amount at least sufficient for the vulcanization of said rubber.

13. A vulcanizable composition comprising high sulfur soft plastic of the type of additive polysulfides of olefines of the general formula $C_nH_{2n}$, unvulcanized rubber in substantial quantities relative to the amount of plastic and sulfur in amount considerably exceeding that necessary for the vulcanization of said rubber.

14. A vulcanizable composition comprising high sulfur soft plastic of the type of additive polysulfides of olefines of the general formula $C_nH_{2n}$, unvulcanized rubber, and sulfur, in substantially equal quantities.

15. A vulcanized composition of matter, comprising high sulfur plastic of the type of additive polysulfides of olefines of the general formula $C_nH_{2n}$, unvulcanized rubber, and sulfur, vulcanized together.

16. A vulcanized composition of matter comprising high sulfur plastic of the type of additive polysulfides of olefines of the general formula $C_nH_{2n}$, unvulcanized rubber in substantial quantities relative to the amount of plastic, and sulfur, vulcanized together.

17. A vulcanized composition of matter comprising high sulfur plastic of the type of additive polysulfides of olefines of the general formula $C_nH_{2n}$, unvulcanized rubber in substantial quantities relative to the amount of plastic and sulfur in amount considerably exceeding that necessary for the vulcanization of said rubber, vulcanized together.

18. As an article of manufacture, a vulcanized material strongly resembling soft vulcanized rubber in mechanical properties containing a plastic of the type of additive polysulfides of olefines of the general formula $C_nH_{2n}$, rubber and sulfur, the total proportion of sulfur uncombined and combined with the rubber and in the olefine polysulfide plastic being not substantially less than 50%.

In testimony whereof we have hereunto set our hands and seals this 10th day of May, 1928.

JOSEPH C. PATRICK.
NATHAN M. MNOOKIN.